(12) United States Patent
Jackson

(10) Patent No.: US 7,835,583 B2
(45) Date of Patent: Nov. 16, 2010

(54) METHOD OF SEPARATING VERTICAL AND HORIZONTAL COMPONENTS OF A RASTERIZED IMAGE

(75) Inventor: Stephen Billings Jackson, La Honda, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 998 days.

(21) Appl. No.: 11/644,864

(22) Filed: Dec. 22, 2006

(65) Prior Publication Data

US 2008/0152249 A1 Jun. 26, 2008

(51) Int. Cl.
G06K 9/42 (2006.01)

(52) U.S. Cl. .................. 382/259; 382/100; 382/173; 382/199; 382/258; 358/1.6; 347/19; 347/55

(58) Field of Classification Search ............. 382/100, 382/141, 144, 145, 173, 174, 199, 256–260, 382/266; 358/1.6
See application file for complete search history.

(56) References Cited

U.S. PATENT DOCUMENTS

| | | | | |
|---|---|---|---|---|
| 6,247,787 B1 * | 6/2001 | Giere et al. | ................ | 347/40 |
| 6,296,343 B1 * | 10/2001 | Alfaro | ................ | 347/43 |
| 6,406,111 B1 * | 6/2002 | Klassen et al. | ................ | 347/9 |
| 6,890,050 B2 * | 5/2005 | Ready et al. | ................ | 347/19 |
| 6,972,261 B2 | 12/2005 | Wong et al. | | |
| 7,023,441 B2 * | 4/2006 | Choi et al. | ................ | 345/441 |

OTHER PUBLICATIONS

Gao, Fuquan, Ain A. Sonin, Precise Deposition of Molten Microdrops: The Physics of Digital Microfabrication, Proceedings: Mathematical and Physical Sciences, vol. 444, No. 1922 (Mar. 8, 1994), The Royal Society.
Schiaffino, Stefano and Ain A. Sonin, Molten Droplet Deposition and Soldification at Low Weber Numbers, Phys. Fluids p. 3172, Nov. 1997 American Institute of Physics.
Schiaffino, Stefano and Ain A. Sonin, Formation and Stability of Liquid and Molten Beads on a Solid Surface, J. Fluid Mech. (1997) vol. 343, pp. 95-110, 1997 Cambridge University Press.

* cited by examiner

*Primary Examiner*—Matthew C Bella
*Assistant Examiner*—Eric Rush
(74) *Attorney, Agent, or Firm*—Fay Sharpe LLP

(57) ABSTRACT

A method of separating an image is provided. The method comprises: running a bitmap image of at least one polygon comprising a plurality of pixels through a distance filter; skeletonizing the polygon formed after filtering by modulo arithmetic; logically ANDing the skeletonized image with two masks separately consisting of horizontal and vertical lines of 1 bit thickness at a particular frequency to form an image of the horizontal edges and an image of the vertical edges; and filtering the resulting image through a particle filter eliminating particles of size greater than 2.

18 Claims, 12 Drawing Sheets

METHOD OF SEPARATING VERTICAL AND HORIZONTAL COMPONENTS OF A RASTERIZED IMAGE

BACKGROUND

The exemplary embodiment relates generally to image processing systems and, more particularly, to a method of separating vertical and horizontal components of a rasterized image.

A printed circuit board, or PCB, is a self-contained module of interconnected electronic components found in devices ranging from common beepers, or pagers, and radios to sophisticated radar and computer systems. The circuits are generally formed by a thin layer of conducting material deposited, or "printed," on the surface of an insulating board known as the substrate. Individual electronic components are placed on the surface of the substrate and soldered to the interconnecting circuits. Contact fingers along one or more edges of the substrate act as connectors to other PCBs or to external electrical devices such as on-off switches. A printed circuit board may have circuits that perform a single function, such as a signal amplifier, or multiple functions.

Two other types of circuit assemblies are related to the printed circuit board. An integrated circuit, sometimes called an IC or microchip, performs similar functions to a printed circuit board except the IC contains many more circuits and components that are electrochemically "grown" in place on the surface of a very small chip of silicon. A hybrid circuit, as the name implies, looks like a printed circuit board, but contains some components that are grown onto the surface of the substrate rather than being placed on the surface and soldered.

Ink-jet printing of circuits is an emerging technology that attempts to reduce the costs associated with production by replacing expensive lithographic processes with simple printing operations. By printing a pattern directly on a substrate rather than using the delicate and time-consuming lithography processes used in conventional manufacturing, a printing system can significantly reduce production costs. The printed pattern can either comprise actual features (i.e., elements that will be incorporated into the final circuit, such as the gates and source and drain regions of thin film transistors, signal lines, opto-electronic device components, etc.) or it can be a mask for subsequent semiconductor or printed circuit board processing (e.g., etch, implant, etc.).

Ink-jet printing of circuits is an emerging technology that attempts to reduce the costs associated with production by replacing expensive lithographic processes with simple printing operations. By printing a pattern directly on a substrate rather than using the delicate and time-consuming lithography processes used in conventional manufacturing, a printing system can significantly reduce production costs. The printed pattern can either comprise actual circuit features (i.e., elements that will be incorporated into the final circuit, such as the gates and source and drain regions of thin film transistors, signal lines, opto-electronic device components, etc.) or it can be a mask for subsequent semiconductor processing (e.g., etch, implant, etc.).

Several forms of printing etch masks exist. One example is that of a printed wax pattern used as a copper etch mask for creating PCBs. Another example is laser direct imaging (LDI), a maskless lithography method that is currently being used for copper etch masks on PCBs. It uses a laser to write the raster image of the pattern directly on the photoresist. In order for it to be to be cost-effective, it is necessary to have special high speed resists. Also, there is no suitable method for soldermask patterning using laser.

Typically, circuit printing involves depositing a print solution (generally an organic material) by raster bitmap along a single axis (the "print travel axis") across a solid substrate. Print heads, and in particular, the arrangements of the ejectors incorporated in those print heads, are optimized for printing along this print travel axis. Printing of a pattern takes place in a raster fashion, with the print head making "printing passes" across the substrate as the ejector(s) in the print head dispense individual droplets of print solution onto the substrate. At the end of each printing pass, the print head makes a perpendicular shift relative to the print travel axis before beginning a new printing pass. The print head continues making printing passes across the substrate in this manner until the pattern has been fully printed.

Once dispensed from the ejector(s) of the print head, print solution droplets attach themselves to the substrate through a wetting action and proceed to solidify in place. The size and profile of the deposited material is guided by competing processes of solidification and wetting. In the case of printing phase-change materials for etch mask production, solidification occurs when the printed drop loses its thermal energy to the substrate and reverts to a solid form. In another case, colloidal suspensions such as organic polymers and suspensions of electronic material in a solvent or carrier are printed and wet to the substrate leaving a printed feature. The thermal conditions and material properties of the print solution and substrate, along with the ambient atmospheric conditions, determine the specific rate at which the deposited print solution transforms from a liquid to a solid.

Wax printers produce smaller lines in the process direction than in the cross process direction due to shooting the new drop on a partially melted drop as opposed to printing on a frozen drop. This necessitates separating the horizontal and vertical components of the image prior to printing. This can be easily done with images formed from vectors and arcs such as .dxf files, but this presents a problem for rasterized images and bitmaps.

In a typical printing process, the cell size/addressability is comparable to the spot size, thus resulting in good reproduction of the images. In the case of semiconductor fabrication processes, good spot placement accuracy (~5 um) is desired. In order to obtain this, it is necessary to print at high addressability (4800DPI corresponding to ~5 µm cell size), especially if the print head has unevenly spaced ejectors. When the cell size is much smaller than the spot size (e.g., cell size ~5 um and spot size ~50 µm), large accumulation of the printed material will be observed as shown in FIG. 1. Some regions in the figure are out of focus due to the uneven height of the printed material. Printing at a resolution (DPI) with a cell size corresponding to the spot size should yield the best results, as shown in FIG. 2. When rasterization of the image is done at high addressability and then printed, there is a large three-dimensional accumulation of the masking layer that is printed, which destroys the features that are obtained, as shown in FIG. 3. This may require decimation (removal of pixels in an orderly fashion).

Thus, a method of overcoming the above-mentioned difficulties and others is needed.

INCORPORATION BY REFERENCE

The following references, the disclosures of which are incorporated herein in their entireties by reference, are mentioned:

U.S. Pat. No. 6,972,261, issued Dec. 6, 2005 to Wong et al., entitled "METHOD FOR FABRICATING FINE FEATURES BY JET-PRINTING AND SURFACE TREAT- MENT," describes a method of forming smaller features by jet-printing with materials from aqueous or non-aqueous organic solutions.

U.S. Pat. No. 6,890,050, issued May 10, 2005 to Ready et al., entitled "METHOD FOR THE PRINTING OF HOMOGENEOUS ELECTRONIC MATERIAL WITH A MULTI-EJECTOR PRINT HEAD," describes a system and method for accurately printing IC patterns and allows the printed features to be optimized for edge profile and electrical continuity.

BRIEF DESCRIPTION

In one embodiment, a method of separating an image is provided. The method comprises: running a bitmap image of at least one polygon comprising a plurality of pixels through a distance filter; skeletonizing the polygon formed after filtering by modulo arithmetic; logically ANDing the skeletonized image with two masks separately consisting of horizontal and vertical lines of 1 bit thickness at a particular frequency to form an image of the horizontal edges and an image of the vertical edges; and filtering the resulting image through a particle filter eliminating particles of size greater than 2.

In another embodiment, a storage medium storing a set of program instructions executable on a data processing device and usable to separate an image is provided. The set of program instructions comprises: instructions for running a bitmap image of at least one polygon comprising a plurality of pixels through a distance filter; instructions for skeletonizing the polygon formed after filtering by modulo arithmetic; instructions for logically ANDing the skeletonized image with two masks separately consisting of horizontal and vertical lines of 1 bit thickness at a particular frequency to form an image of the horizontal edges and an image of the vertical edges; and instructions for filtering the resulting image through a particle filter eliminating particles of size greater than 2.

DETAILED DESCRIPTION

Figure 1:
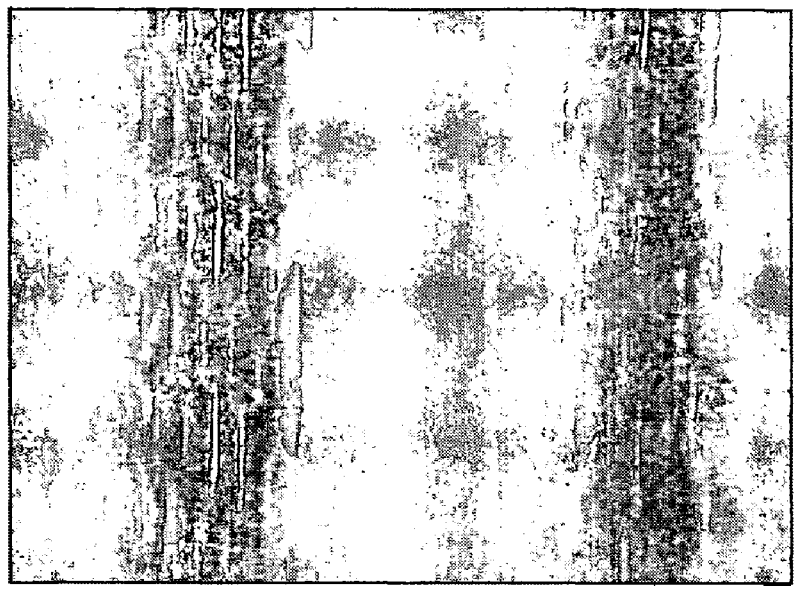
FIG. 1 illustrates fill printed at high addressability showing large accumulation of printed material.
Figure 2:
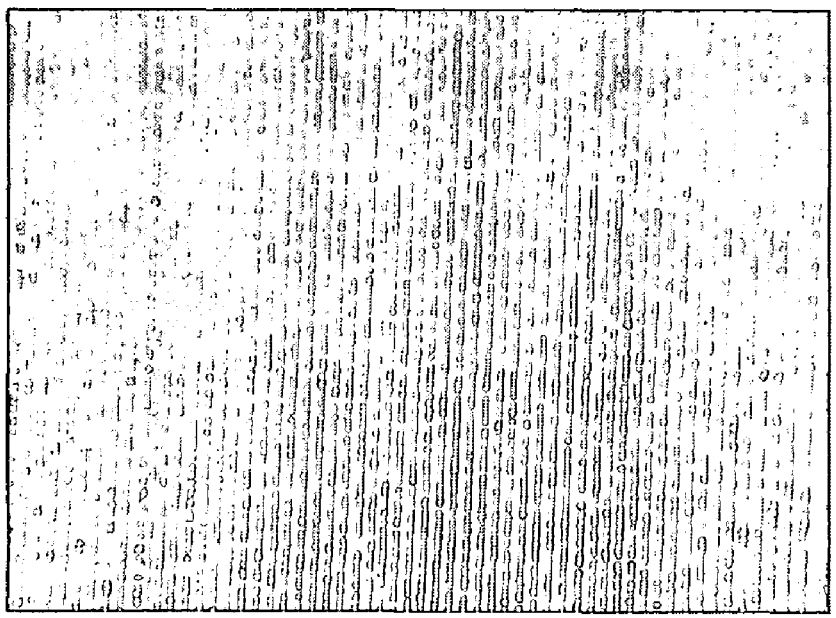
FIG. 2 illustrates fill printed at 600 DPI showing good coverage.
Figure 3:
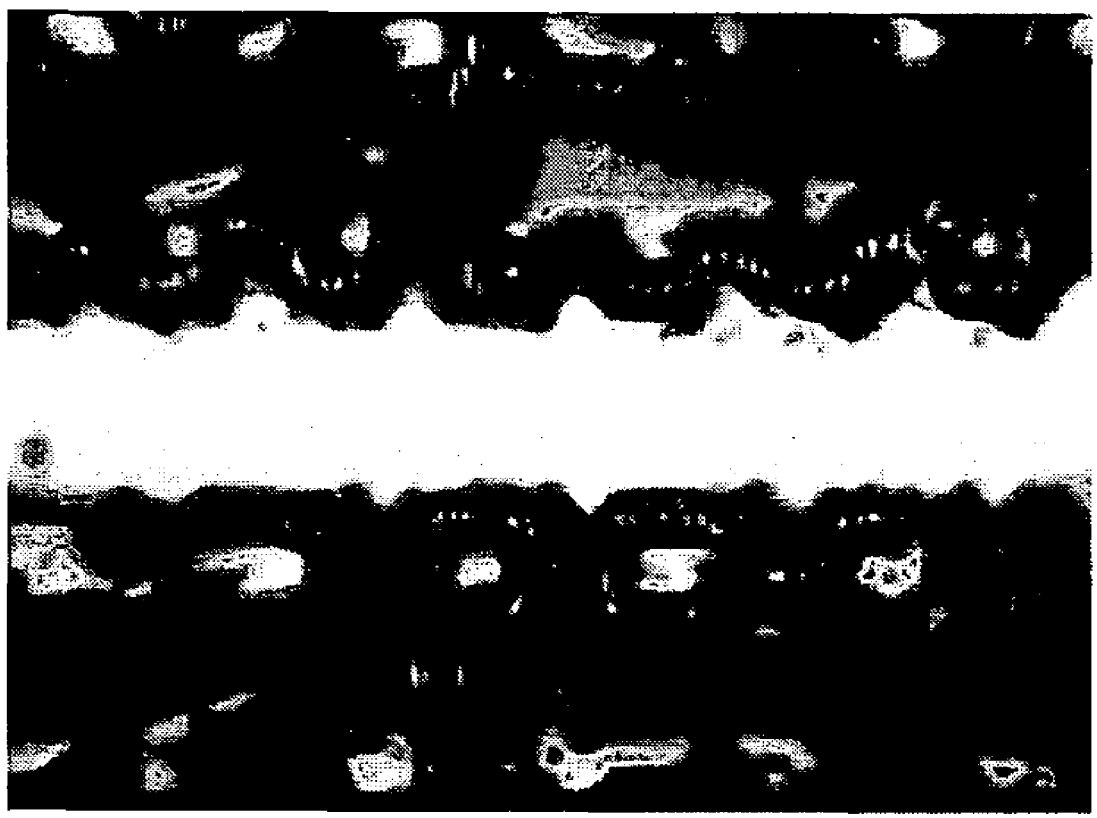
FIG. 3 illustrates an image printed at high addressability without appropriate decimation.

Some portions of the detailed description that follows are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems will be apparent from the description below. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

In describing the exemplary embodiments, the term "data" refers herein to physical signals that indicate or include information. In this case, "image," as a pattern of physical light or a collection of data representing the physical light, may include characters, words, and text as well as other features such as graphics and circuit layouts. An operation performs "image processing" when it operates on an item of data that relates to a part or all of an image.

An image may be a high addressability image if even only a single pixel of the image is formatted, sampled or produced in one of many known scenarios, all of which may apply to various embodiments. A high addressability pixel can be a pixel comprising a plurality of high addressability pixel events, where, for example, each of the high addressability pixel events corresponds to a specific spatial placement of the writing spot with respect to the pixel and has a value that represents a property of the writing spot at that specific spatial placement. In binary high addressability pixels, for example, each high addressability pixel event is a single bit indicating whether the writing spot is "on" or "off" at the corresponding spatial placement.

High addressability also commonly refers to an imaging method where the imaging device can position the writing spot with precision finer than the size of the writing spot. For instance, a typical high addressability system may operate with a 40 μm writing spot, an addressability of 600 DPI in the direction perpendicular to the raster lines, and an addressability of 4800 DPI in the direction of the raster lines.

High addressability also refers to writing an image with a higher sampling resolution than is input to the writing system. Similarly, high addressability also refers to a pixel sampling resolution that is higher than the input resolution in at least one dimension. For example, an input resolution of 300 DPI may be converted to 600 DPI and that resolution conversion is referred to as high addressability.

Systems that write high addressability images typically regulate a laser or similar writing device using clock modulation, amplitude modulation, pulse width modulation, pulse width position modulation or equivalent procedures. Imaging devices other than laser scanners can also employ high addressability. For instance, ink jet devices can have drop ejection rates that yield spot placements at high addressability and LED image bars can clock the LED "on" events at rates that are high relative to the spot size and diode spacing.

One or more of the features of the exemplary embodiments described herein may be applied to any digital image, including, for example, a high addressability image.

In the following detailed description a method of jet-printing smooth micro-scale features on a substrate using printed patterns will be described. Note that while the embodiments disclosed herein are described with respect to circuit printing for explanatory purposes, these embodiments can be applied to any situation in which high resolution features, resulting from a printing system, are required.

Figure 4:
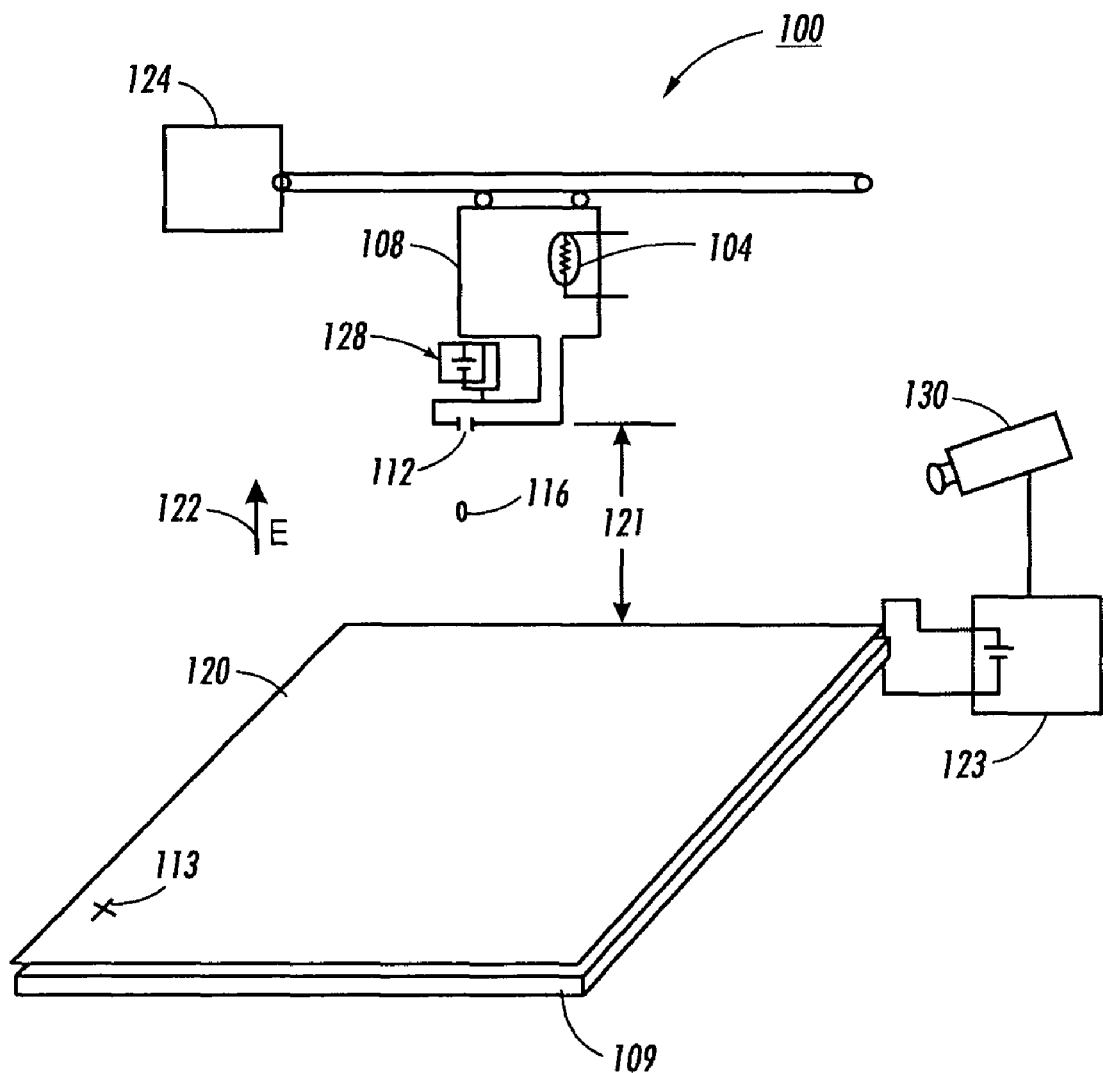
FIG. 4 is a perspective view of a printing system suitable for circuit printing.

FIG. 4 is a perspective view of a printing system 100 suitable for IC and PCB printing. Note that while the embodiments disclosed herein are described with respect to IC and PCB printing for explanatory purposes, these embodiments can be applied to any situation in which homogenous, smooth-walled features in a digital lithography pattern is required.

FIG. 4 includes a heat source 104 that heats a reservoir 108 of typically phase-change material to a temperature that is sufficient to maintain the material in a liquid state. The system 100 is suitable for creating a pattern, typically using a printer to controllably eject individual droplets to form a patterned protective layer or coating over regions of the substrate to define the outline and fill regions of the desired feature(s). Regions that were not at one time covered by protective layer will be subject to deposition (or removal) of materials used to form various features. Thus, feature size will not be limited by droplet size, but instead by how closely droplet spots can be positioned together without combining to form a joined feature. Generally, the temperature of the reservoir 108 is maintained above 100 degrees C. and in some embodiments, at temperatures above 140 degrees C., a temperature sufficient to liquify most phase change organics.

The phase-change material may be an organic media that melts at low temperatures. Other desirable characteristics of the phase-change material include that the patterning material is non-reactive with organic and inorganic materials used in typical semiconductor materials processing, and that the phase change material has a high selectivity to etchants. If liquid suspension is used, the substrate material is maintained above the boiling point of the liquid, and after deposition of the patterning material, the liquid carrier evaporates upon contact with the substrate surface. When evaporation is used, the phase change process is directed from liquid to vapor, rather than from liquid to solid.

An additional desirable characteristic of the phase-change patterning material is that the resulting pattern should be robust enough to withstand wet-chemical or dry etching processes. Wax is an example of a phase-change material for both these processes. Kemamide 180-based waxes from Xerox Corporation of Stamford Conn. is but one example of a suitable wax for use as a phase-change patterning material.

One or more droplet sources 112 such as a print head receives the liquid phase-change marking material from the reservoir 108 and outputs droplets 116 for deposition on a substrate 120. Typical substrate 120 materials are silicon, glass, and printed circuits boards. The substrate 120 is maintained at a temperature such that the droplet cools rapidly after deposition. A wetting agent, typically a dielectric material such as silicon dioxide, $SiO_2$ or silicon nitride, $Si_3N_4$, may be included on the surface to enhance wetting thereby assuring that sufficient wetting occurs to form a good contact between the pattern and the substrate. The temperature of the system is maintained such that the cooling rate is sufficient to control the behavior of the droplet after contacting the substrate 120 despite the enhanced wetting properties of the surface to be etched.

When increased coalescence between adjacent printed droplets is required, the substrate temperature can be increased to increase droplet spreading and thereby increase coalescence. When printing lines of Kemamide-based wax from an acoustic ink-jet printer, it has been found that increasing the substrate temperature from 30 degrees to 40 degrees C. improves the print quality of the pattern. In the case of Kemamide-based waxes, it has been found that excellent results are achieved when the surface is maintained at 40 degrees centigrade, which is about 20 degrees C. below the freezing point of the wax. At 40 degrees C., the temperature of the substrate is still low enough that the droplet rapidly "freezes" upon contacting substrate 120.

In order to minimize the possibility of partial midair freezing of droplets in the space 121 between the droplet source 112 and the substrate 120, an electric field 122 may be applied to accelerate the droplet from the droplet source 112 to the substrate 120. The electric field 122 may be generated by applying a voltage, typically between one to three kilovolts between the droplet source 112 and an electrode or platen 109 under the substrate 120. For this voltage, the space 121 between the print head and the substrate should be held to a corresponding typical range of 0.5-1.0 mm. The electric field 122 minimizes droplet transit time through the space 121 and allows substrate surface temperature to be the primary factor controlling the phase change operation. Moreover, the increased droplet velocity in the space 121 improves the directionality of the droplet allowing for improved straight-line features.

After a droplet of marking material is deposited on the substrate 120, the relative positions of the substrate and the droplet source are adjusted to reposition the droplet source over a second position to be patterned. The repositioning operation may be achieved either by moving the droplet source 112 or by moving the substrate 120. A control circuit 124 establishes relative motion between the droplet source 112 and the substrate 120 in a predetermined pattern. A driver circuit 128 provides energy to the droplet source 112 causing ejection of droplets when the droplet source 112 is positioned opposite a region of the substrate 120 to be patterned. By coordinating the movement of the droplet source 112 with the timing of droplet source outputs, a pattern can be "printed" on the substrate 120.

As each spot is printed, a feedback system may be used to assure spots of proper size. An imaging system, such as a camera 130, may be used to monitor spot size. When smaller features are to be printed, or the spot size otherwise reduced, a temperature control circuit 123 lowers the temperature of a surface of the substrate 120. The lower temperature increases the quench rate resulting in rapid solidification of the phase change patterning material upon contact with the substrate 120. When larger spots are needed, usually for merging spots to form larger features, the temperature control circuit 123 raises the temperature of the substrate 120. The temperature control circuit 123 may include a heating element thermally coupled to the substrate 120 such that ambient heating of media around the substrate is minimized.

Generally, the phase change material is a solid at temperatures below approximately 60 degrees C. As such, it may be unnecessary to cool the substrate below room temperature because, as previously described, a sufficiently small droplet cools rapidly when a 20 degree temperature differential is maintained between the freezing point of the phase change material and the substrate temperature. In such cases, the temperature control circuit may merely be a sensor and a heater that raises the substrate slightly above room temperature when larger feature sizes are to be printed.

In order to control and align the movement of the droplet source 112, printed alignment marks, such as a mark 113, patterned from a previous patterned layer may be used to coordinate the next overlying layer. An image processing system such as the previously described camera may be used to capture the orientation of the previous patterned layer. A processing system then adjusts the position of the overlying pattern layer by altering the pattern image file before actual printing of the pattern layer Each droplet source may be implemented using a variety of technologies including traditional ink-jet technology and the use of sound waves to cause ejection of droplets of patterning material as done in acoustic ink printing systems.

To obtain the desired pattern results from the printing system 100, the layout data must be appropriately processed, the print head 112 must be properly configured, and the print head 112 must be accurately aligned and calibrated with respect to the substrate 120.

Figure 5:
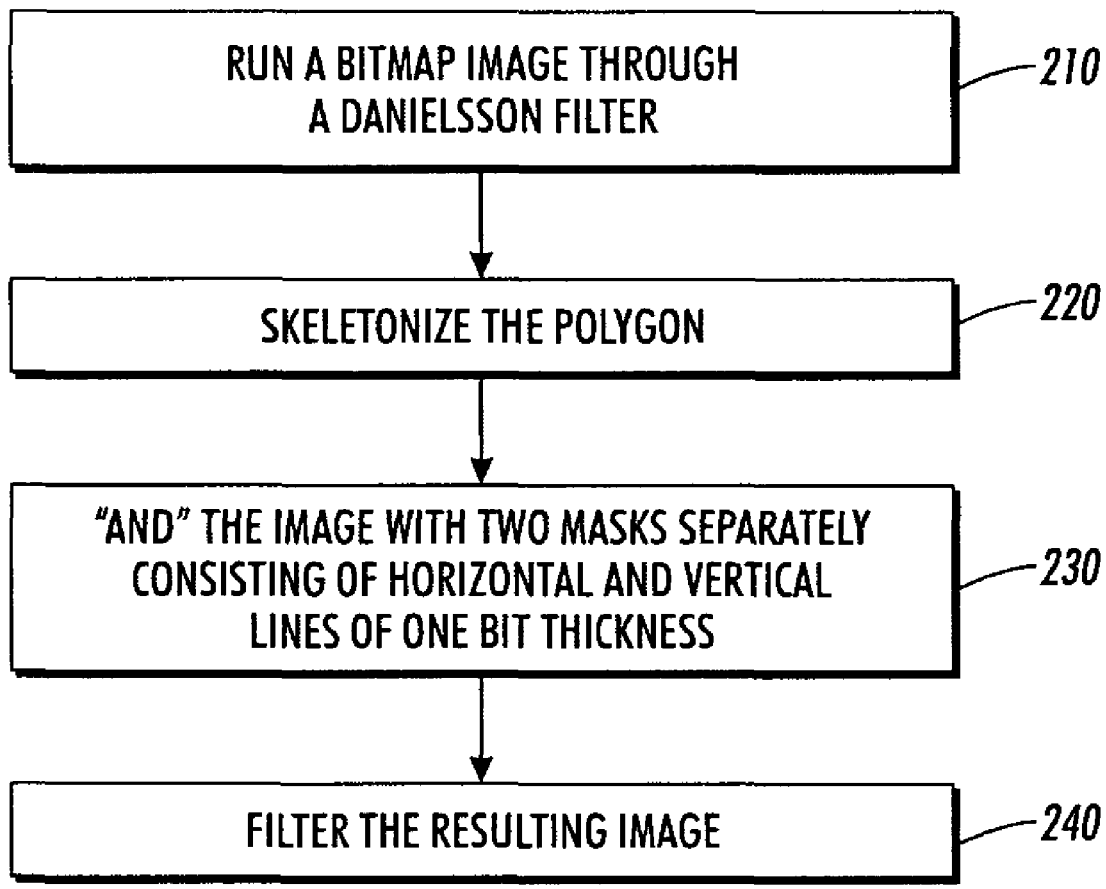
FIG. 5 shows a flowchart of a method of separating horizontal and vertical components in accordance with aspects of the exemplary embodiment.

As stated earlier, the printing system will produce smaller lines in the process direction than in the cross process direction due to shooting the new drop on a partially melted drop as opposed to printing on a frozen drop. This necessitates separating the horizontal and vertical components of the image prior to printing. Also, when rasterization of the image is done at high addressability and then printed, there is a large three-dimensional accumulation of the masking layer that is printed, which destroys the features that are obtained. This may require decimation (i.e., the removal of pixels in an orderly fashion). Thus, the method outlined in FIG. 5 performs both of these tasks.

Figure 6:
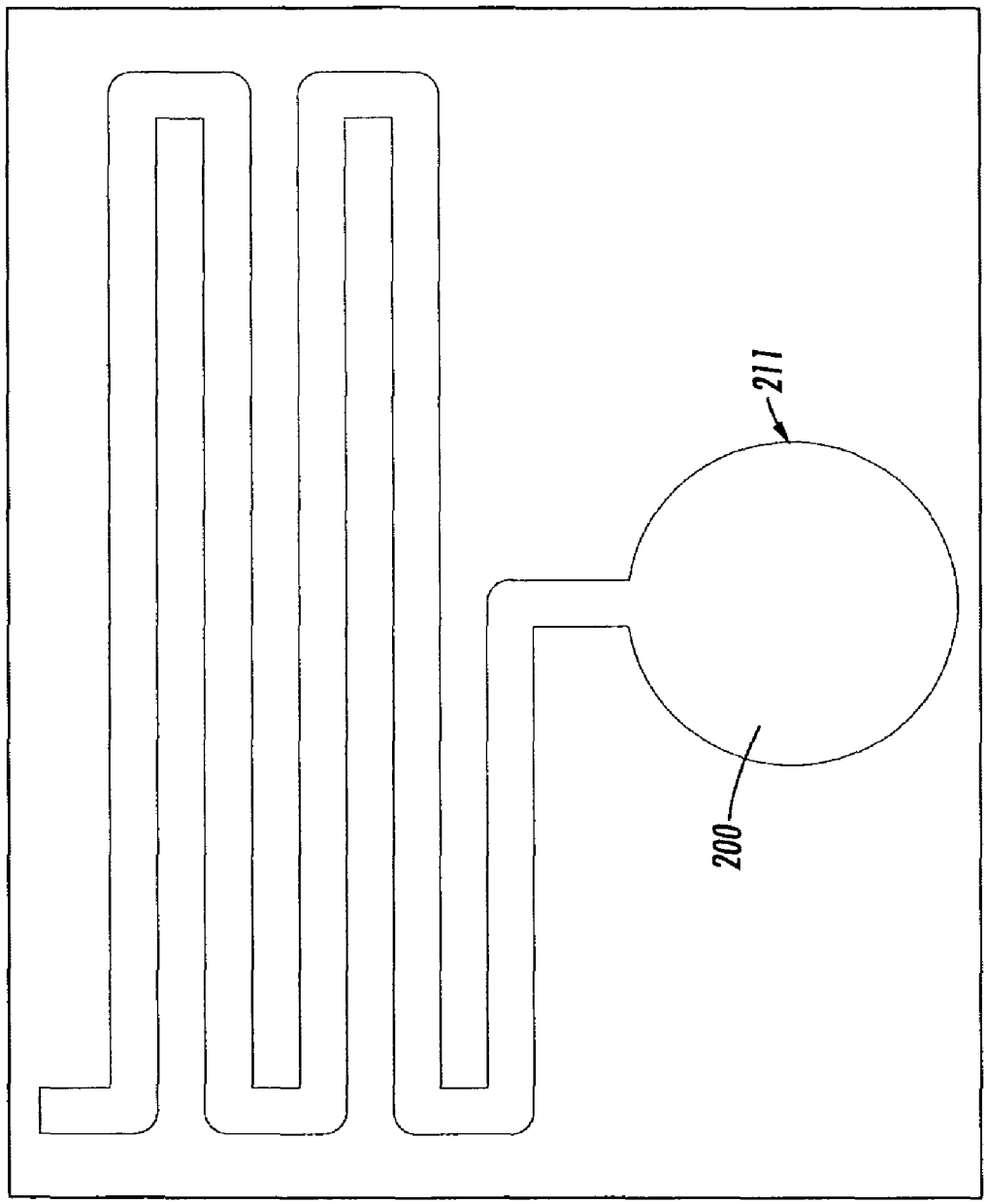
FIG. 6 shows a full bitmap image before processing.
Figure 7:
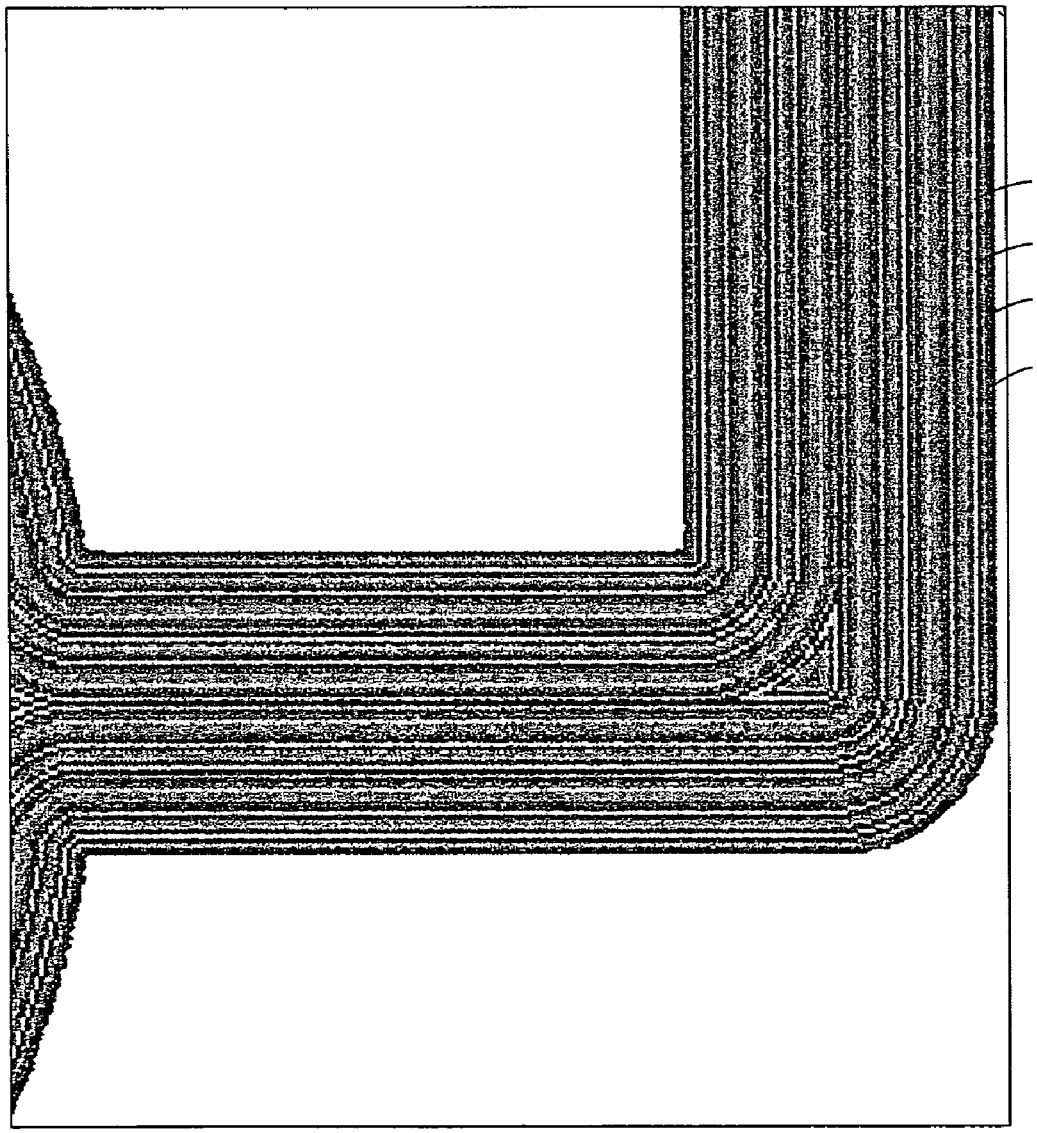
FIG. 7 shows an example of a distance filter.

A full bitmap image (or raster image) of one or more polygons 200 before processing is shown in FIG. 6. All closed polygons 200 are assumed to be filled areas. The filled area 200 of the polygon is first run through a distance filter such as a Danielsson filter, which encodes each pixel with the value of its distance from the edge 211 of the polygon of which it is a part (210). A Danielsson filter is a type of edge distance filter for closed polygons. It takes each bit inside the polygon and finds the distance to the closest edge of the polygon in pixel units and then encodes that as the value of the pixel. This may also be a simple distance filter which counts how far each pixel is from the edge 211 of the enclosing polygon and encodes that as the pixel value. In the image shown in FIG. 7 the first line 212 represents pixels that are 1 pixel away from the edge of the polygon, the second line 214 represents pixels that are 2 pixels away, the third line 216 represents pixels that are 3 pixels away, the fourth line 218 represents pixels that are 4 pixels away and so forth.

The polygon is then skeletonized by modular arithmetic by giving the pixel values that are an integer number greater than 1 away from the edge a value of 1 and giving the rest a value of 0 (220). Modular arithmetic (sometimes called modulo arithmetic, or clock arithmetic because of its use in the 24-hour clock system) is a system of arithmetic for integers, where numbers "wrap around" after they reach a certain value—the modulus. And, briefly, skeletonization of images is a process for reducing foreground regions in an image to a skeletal remnant. This remnant largely preserves the extent and connectivity of the original region, while discarding most of the original foreground pixels. Skeletonization is typically performed in one of two ways. With one class of techniques, a morphological thinning is provided that successively erodes away pixels from the edges of each ridge line in such a way that no more thinning is possible and the medial line is left. What remains approximates the skeleton. With the other class of techniques, a distance transform of the image is calculated, with the skeleton lying along the singularities in the distance transform. In either case, the resulting skeletonized image may be processed to define points at which the lines end or bifurcate using methods known in the art.

Figure 8:
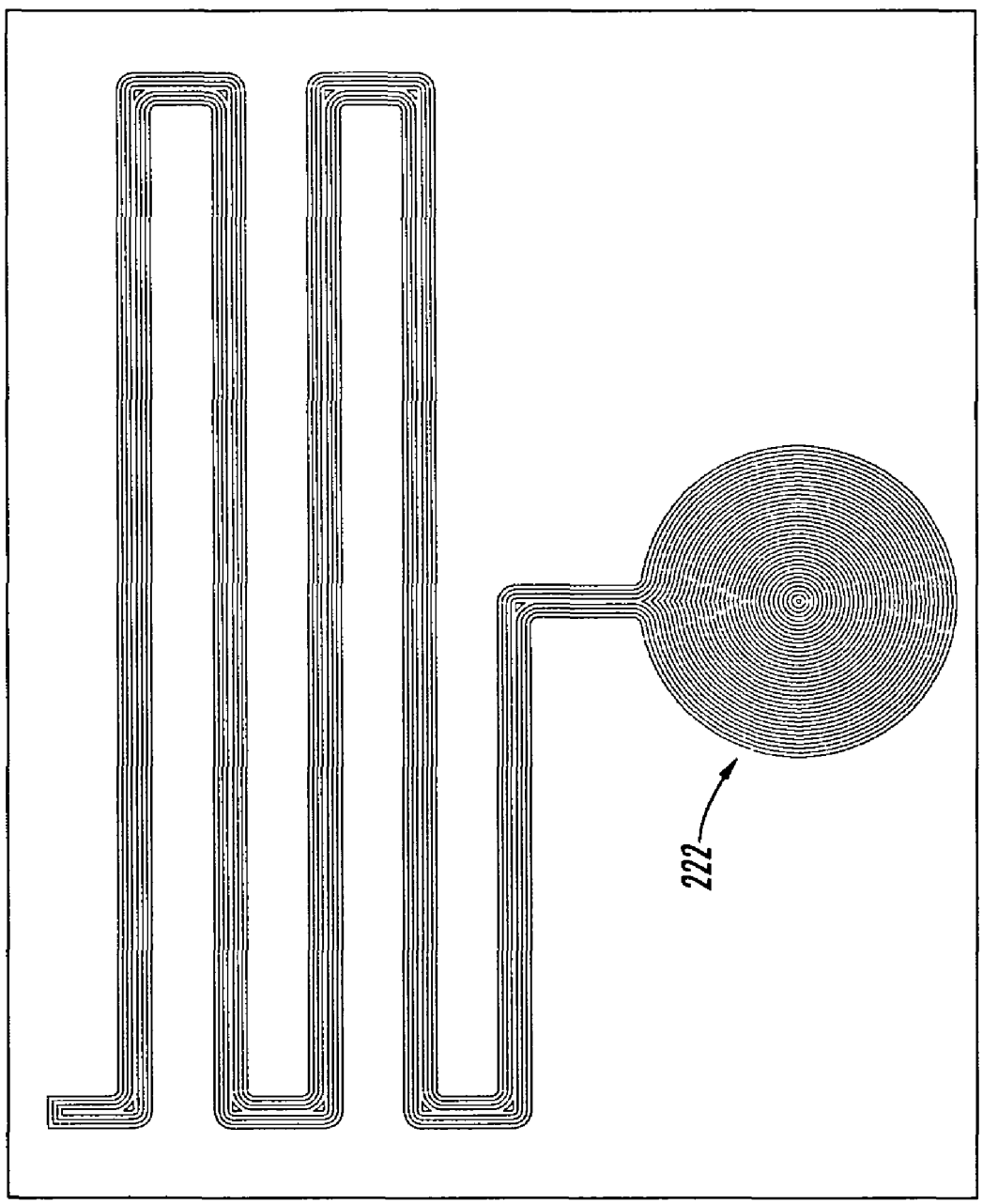
FIG. 8 shows the image after Danielsson filtering and skeletonization with n=6.

This process produces a Danielsson Skeletonized image 222 of the polygon, as shown in FIG. 8. In the example shown we have chosen n=6, which means pixels with values 6, 12, 18, 24, 30, 36 . . . are given a value 1 and all other pixel values are given the value 0. It is to be understood that other values of n may be chosen.

This Danielsson Skeletonized image 222 is logically ANDed with two masks separately, where the first mask consists of vertical lines of 1 bit thickness and the second mask consists of horizontal lines of 1 bit thickness (230). The spacing of the lines in each mask may be any integer value greater than 0, which is, ideally, the decimation frequency. The decimation frequency is chosen to prevent material buildup from drops piling up on each other and it is determined by drop size and pixel resolution. Typically the same value is used as the value that produces the skeletonized image, in this example it is 6.

The resulting image is filtered through a particle filter so as to discard any particles (or blobs of material) of a size greater than 2 (240). Particles of size 2 may or may not be reduced to a single pixel. Particle sizes are measured across the longest axis of blobs composed of adjacent turned on pixels. Turned on pixels diagonal to each other touching only at the corners are adjacent as are pixels sharing a common edge.

Figure 9:
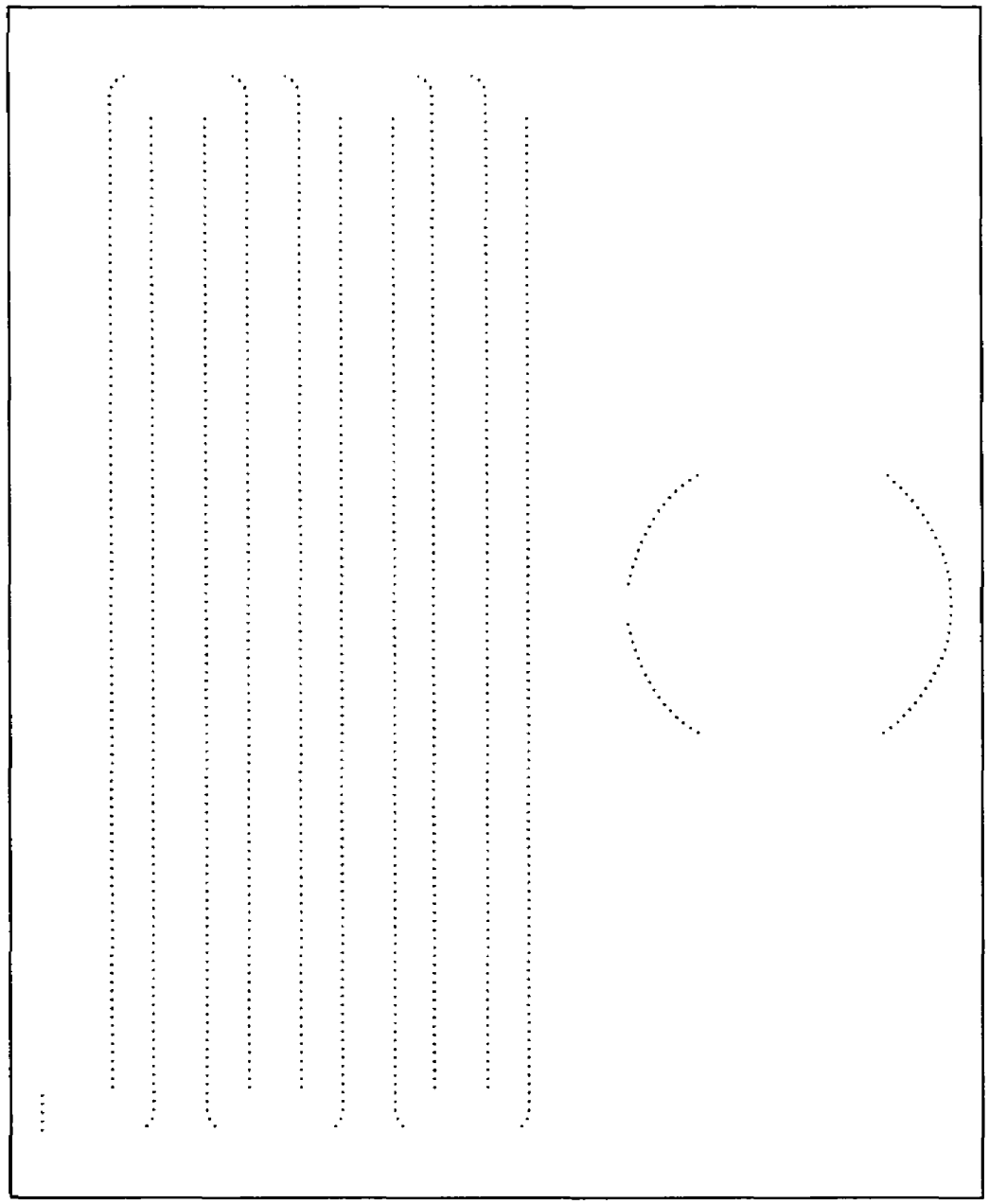
FIG. 9 shows a horizontal edge.
Figure 10:
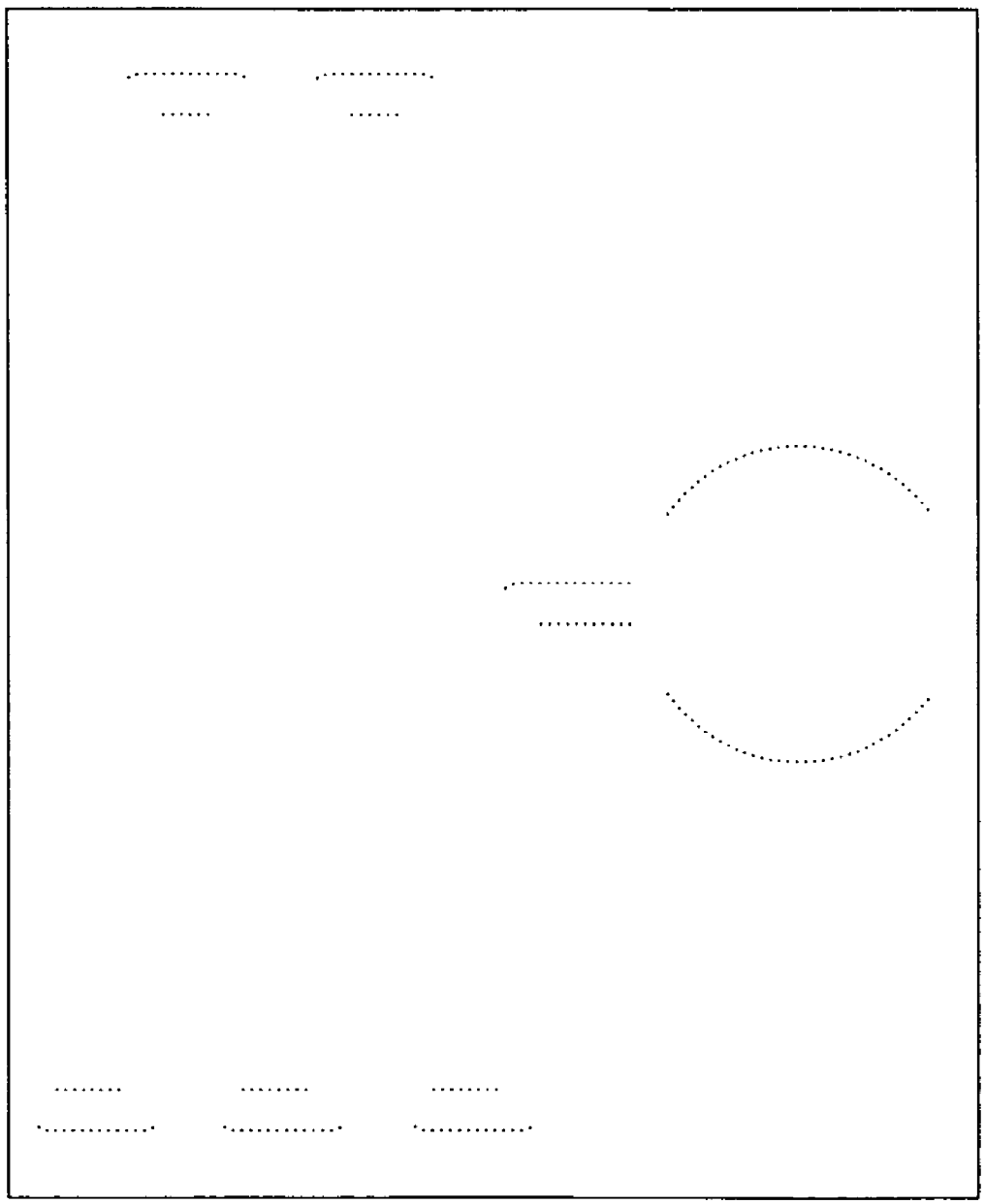
FIG. 10 shows a vertical edge.

The edges are treated similarly but separately as it may be desired to move the edges into the polygon to make the edges of the printed drops conform to the edge of the desired polygon. In this case the Danielsson-filtered polygon is processed such that all the pixels of value n are turned on and all others are turned off. N is typically half of the spot diameter in pixels, in this example it is 3. After ANDing with the horizontal and vertical masks, FIGS. 9 and 10 are produced showing the horizontal and vertical edges, respectively.

Figure 11:
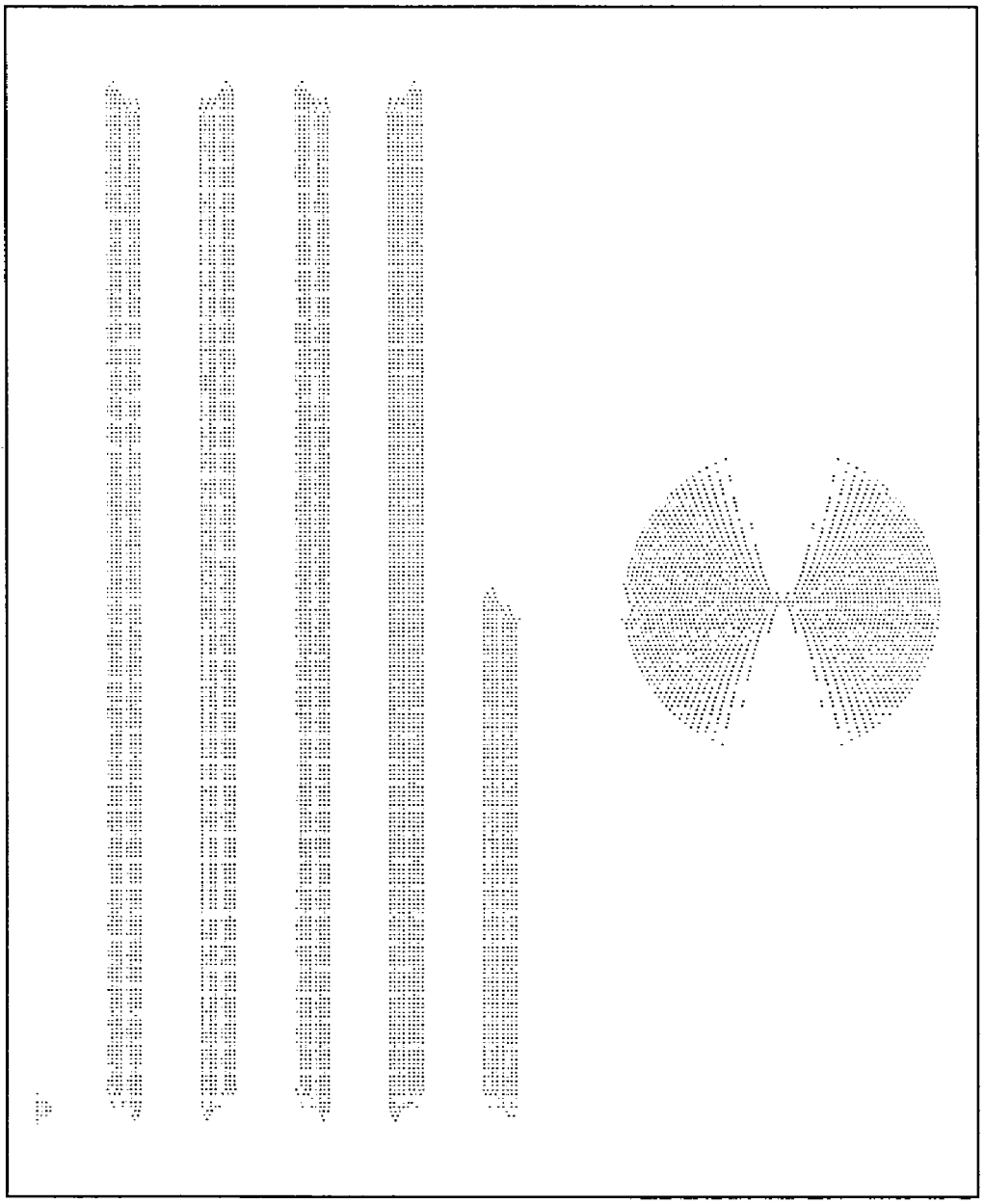
FIG. 11 shows horizontal fill of the image.
Figure 12:
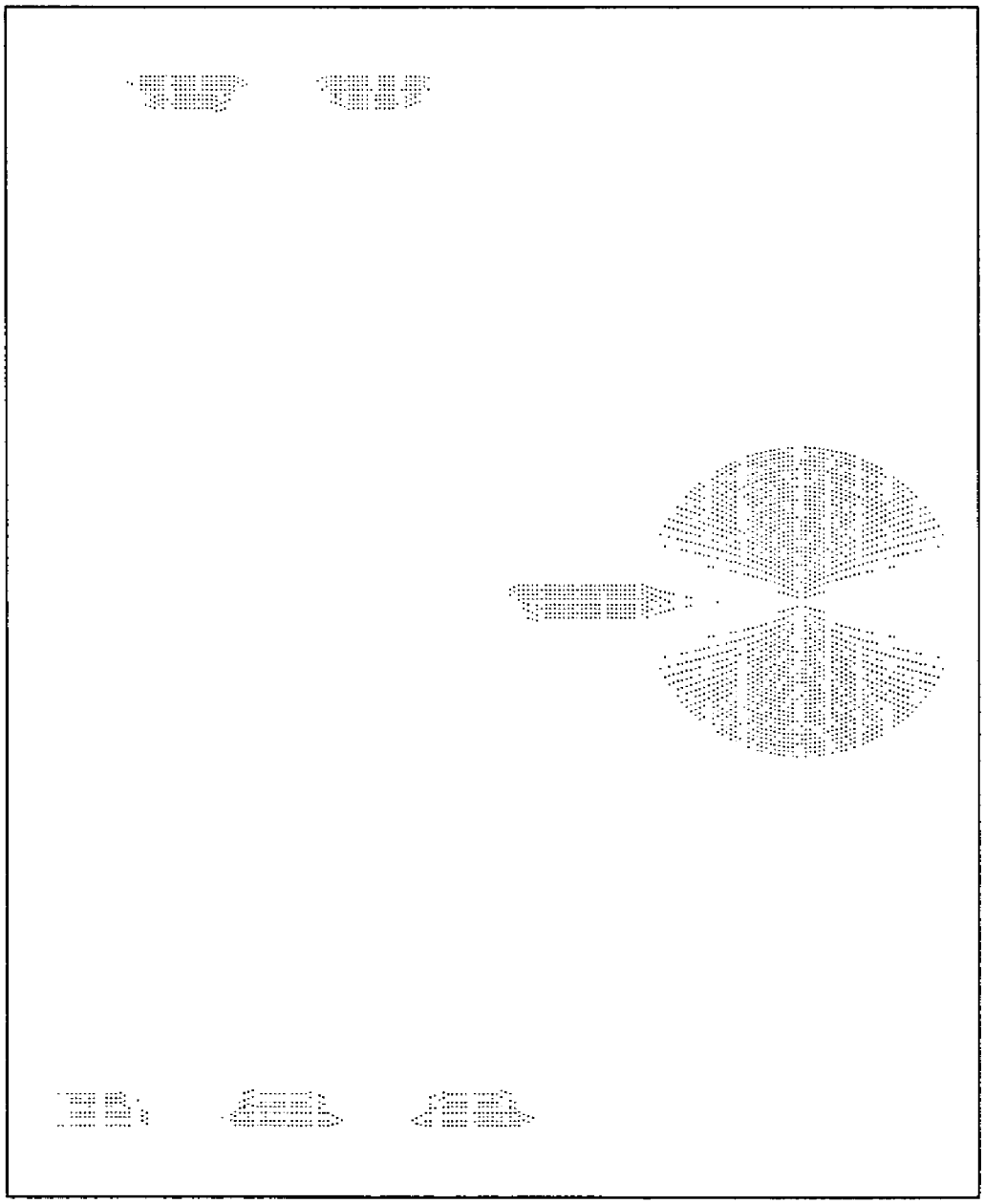
FIG. 12 shows vertical fill of the image.

FIG. 11 shows the image with horizontal fill, while FIG. 12 shows the image with vertical fill. It is desirable to process the fill areas separate from the edges since it is often the case that the desired decimation frequencies are different. Prior to actually printing the images the horizontal edge will be ORed with the horizontal fill and the vertical edge ORed with the vertical fill.

Figure 13:
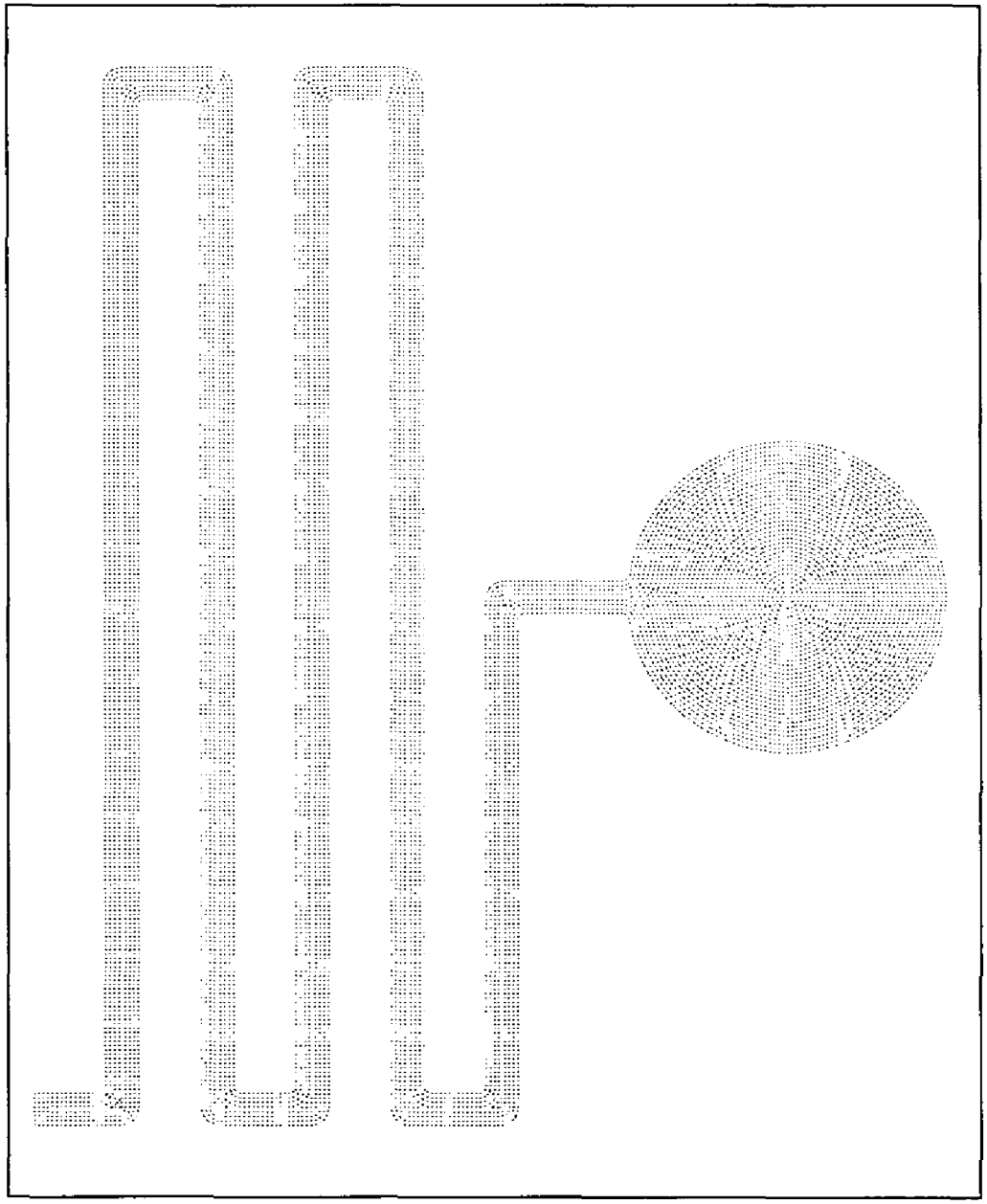
FIG. 13 shows ORed fill of horizontal and vertical.

The inverse of the initial masks with spacing 1 may also be used so that the resulting images are logically ORed together to generate an undecimated image, as shown in FIG. 13. Thus, this method provides a way to separate the horizontal and vertical components without decimation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of separating an image, the method comprising:
   running a bitmap image of at least one polygon comprising a plurality of pixels through a distance filter;
   skeletonizing the polygon, formed after filtering, by modulo arithmetic;
   logically ANDing the skeletonized image with two masks separately consisting of horizontal and vertical lines of 1 bit thickness at a particular frequency to form an image of the horizontal edges and an image of the vertical edges; and
   filtering the resulting edge images through a particle filter eliminating particles of size greater than 2 pixels.

2. The method defined in claim 1, wherein the distance filter comprises a Danielsson filter.

3. The method defined in claim 1, wherein the distance filter comprises a filter that counts how far each pixel in an image is from the edge of the polygon and encodes that as the pixel value.

4. The method defined in claim 1, wherein the skeletonizing step further comprises giving the pixel values that are an integer number greater than 1 pixel away away from the edge of the polygon a value of 1 and giving the rest of the pixels a value of 0.

5. The method defined in claim 1, further comprising measuring particle sizes across the longest axis of particles composed of adjacent turned on pixels.

6. The method defined in claim 1, further comprising:
   logically ORing the horizontal edge image with a horizontal fill; and
   logically ORing the vertical edge image with a vertical fill.

7. The method defined in claim 6, wherein the distance filter comprises a Danielsson filter.

8. The method defined in claim 7, wherein the skeletonizing step further comprises giving the pixel values that are an integer number greater than 1 pixel away away from the edge of the polygon a value of 1 and giving the rest of the pixels a value of 0.

9. The method defined in claim 8, further comprising measuring particle sizes across the longest axis of particles composed of adjacent turned on pixels.

10. A non-transitory storage medium storing a set of program instructions executable on a data processing device and usable to separate an image, the set of program instructions comprising:
    instructions for running a bitmap image of at least one polygon comprising a plurality of pixels through a distance filter;
    instructions for skeletonizing the polygon, formed after filtering, by modulo arithmetic;
    instructions for logically ANDing the skeletonized image with two masks separately consisting of horizontal and vertical lines of 1 bit thickness at a particular frequency to form an image of the horizontal edges and an image of the vertical edges; and
    instructions for filtering the resulting edge images through a particle filter eliminating particles of size greater than 2 pixels.

11. The storage medium defined in claim 10, wherein the distance filter comprises a Danielsson filter.

12. The storage medium defined in claim 10, wherein the distance filter comprises a filter that counts how far each pixel in an image is from the edge of the polygon and encodes that as the pixel value.

13. The storage medium defined in claim 10, wherein the set of program instructions further comprise instructions for giving the pixel values that are an integer number greater than 1 pixel away from the edge of the polygon a value of 1 and giving the rest of the pixels a value of 0.

14. The storage medium defined in claim 10, wherein the set of program instructions further comprise instructions for measuring particle sizes across the longest axis of particles composed of adjacent turned on pixels.

15. The storage medium defined in claim 10, wherein the set of program instructions further comprise:
    instructions for logically ORing the horizontal edge image with a horizontal fill; and
    instructions for logically ORing the vertical edge image with a vertical fill.

16. The storage medium defined in claim 15, wherein the distance filter comprises a Danielsson filter.

17. The storage medium defined in claim 16, wherein the set of program instructions further comprise instructions for giving the pixel values that are an integer number greater than 1 pixel away from the edge of the polygon a value of 1 and giving the rest of the pixels a value of 0.

18. The storage medium defined in claim 17, wherein the set of program instructions further comprise instructions for measuring particle sizes across the longest axis of particles composed of adjacent turned on pixels.

* * * * *